(12) United States Patent
Barnidge et al.

(10) Patent No.: US 10,042,597 B2
(45) Date of Patent: Aug. 7, 2018

(54) REDUNDANT DISPLAY SYSTEM USING EMISSIVE DISPLAY

(71) Applicants: Tracy J. Barnidge, Marion, IA (US); Joseph L. Tchon, Cedar Rapids, IA (US); Blake P. Covington, Mount Vernon, IA (US); Donald E. Mosier, Cedar Rapids, IA (US); Neil C. Johnson, Cedar Rapids, IA (US); Christopher R. Chapman, Marion, IA (US); Maria A. Appel, Cedar Rapids, IA (US)

(72) Inventors: Tracy J. Barnidge, Marion, IA (US); Joseph L. Tchon, Cedar Rapids, IA (US); Blake P. Covington, Mount Vernon, IA (US); Donald E. Mosier, Cedar Rapids, IA (US); Neil C. Johnson, Cedar Rapids, IA (US); Christopher R. Chapman, Marion, IA (US); Maria A. Appel, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 41 days.

(21) Appl. No.: 14/725,628

(22) Filed: May 29, 2015

(65) Prior Publication Data

US 2016/0350049 A1    Dec. 1, 2016

(51) Int. Cl.

| | |
|---|---|
| G09G 5/00 | (2006.01) |
| G06F 3/14 | (2006.01) |
| B64D 43/00 | (2006.01) |
| G06F 3/147 | (2006.01) |

(52) U.S. Cl.
CPC ............ *G06F 3/1423* (2013.01); *B64D 43/00* (2013.01); *G06F 3/147* (2013.01); *G06F 3/1438* (2013.01); *G09G 2300/023* (2013.01); *G09G 2330/08* (2013.01); *G09G 2380/12* (2013.01)

(58) Field of Classification Search
CPC . G09G 3/36; G09F 9/00; G06F 3/1423; Y10S 345/904
See application file for complete search history.

(56) References Cited

U.S. PATENT DOCUMENTS

| | | | | |
|---|---|---|---|---|
| 4,562,433 A | * | 12/1985 | Biferno | G06F 3/147 345/4 |
| 6,268,843 B1 | * | 7/2001 | Arakawa | G09G 3/20 345/102 |
| 6,720,953 B1 | * | 4/2004 | Mitchell | G06F 3/147 345/173 |
| 7,999,759 B2 | * | 8/2011 | Selbrede | G02F 1/1347 345/4 |
| 8,411,235 B1 | * | 4/2013 | Barnidge | G02B 27/22 349/112 |

(Continued)

*Primary Examiner* — Yuzhen Shen
(74) *Attorney, Agent, or Firm* — Angel N. Gerdzhikov; Donna P. Suchy; Daniel M. Barbieri

(57) ABSTRACT

Redundant display systems and methods for providing display redundancy are disclosed. A display system may include a primary display and at least one secondary display. The primary display and the at least one secondary display may be stacked in series relative to a line of sight of a user, and the at least one secondary display may be configured to serve as a backup to the primary display upon a failure of the primary display.

12 Claims, 6 Drawing Sheets

(56) References Cited

U.S. PATENT DOCUMENTS

| | | | |
|---|---|---|---|
| 2006/0119603 A1* | 6/2006 | Chen | G06F 3/1438 345/502 |
| 2007/0181044 A1* | 8/2007 | Baloga | A47B 21/00 108/50.01 |
| 2011/0247249 A1* | 10/2011 | Cao | G06F 1/1601 40/446 |
| 2013/0088523 A1* | 4/2013 | Wu | G09G 3/3611 345/690 |
| 2014/0292695 A1* | 10/2014 | Wakamoto | G06F 3/1423 345/173 |
| 2015/0066360 A1* | 3/2015 | Kirsch | G01C 21/3688 701/438 |
| 2016/0225310 A1* | 8/2016 | Farell | G09G 3/3611 |

\* cited by examiner

REDUNDANT DISPLAY SYSTEM USING EMISSIVE DISPLAY

BACKGROUND

Display systems may broadly include emissive displays and non-emissive displays. An emissive display refers to a display capable of producing an image directly without requiring a backlight. Research in field emission displays, for example, provide various exemplary types of emissive displays. Other types of displays, such as light-emitting diode (LED) displays, organic light-emitting diode (OLED) displays, surface-conduction electron-emitter displays (SEDs) and the like, may also be generally referred to as emissive displays. A non-emissive display, on the other hand, refers to a display that requires a light source. Light modulating display devices, such as liquid crystal displays (LCDs), for example, are non-emissive displays.

In engineering, redundancy is the duplication of critical components of a system with the intention of increasing reliability of the system. Redundancy is required for many aircraft systems, including display systems for delivering critical primary flight information. A conventional implementation of an aircraft display system typically includes multiple displays horizontally positioned across an instrument panel. These displays are secured to fixed locations and cannot be repositioned. Redundancy may be provided by configuring one or more adjacent display with the ability to enter a reversionary mode and serve as a backup to a primary display in case of a primary display failure. The ability for an adjacent display to enter a reversionary mode may allow a pilot to maintain aircraft control and proceed in a degraded state.

It is noted, however, that the location of the adjacent display (now serving as a backup to the primary display) is sub-optimal compared to the location of the primary display. Using a backup display located at a sub-optimal location has several disadvantages. For instance, relocation of the primary flight information on the instrument panel may impact pilot's cross-check habit patterns and may result in extended visual search during periods of high workload. The pilot may also be required to perform additional actions in order to view detailed system information due to the display being used in the reversionary mode. In addition, the need for having to equip an instrument panel with multiple displays (so that adjacent displays can serve as backups) may contribute to added weight and excessive instrument panel clutter. Furthermore, a display that may serve as a backup display needs to be configured in a manner that can maintain readability across an extended field of view, resulting in the need for additional power or added unit cost.

SUMMARY

In one aspect, embodiments of the inventive concepts disclosed herein are directed to an apparatus. The apparatus may include a primary display and at least one secondary display. The primary display and the at least one secondary display may be stacked in series relative to a line of sight of a user, and the at least one secondary display may be configured to serve as a backup to the primary display upon a failure of the primary display.

In a further aspect, embodiments of the inventive concepts disclosed herein are directed to an apparatus. The apparatus may include a primary display and at least one secondary display positioned behind the primary display in series relative to a line of sight of a user. The primary display may be configured to appear substantially transparent upon a failure of the primary display, and the at least one secondary display may be configured to serve as a backup to the primary display upon a failure of the primary display.

In another aspect, embodiments of the inventive concepts disclosed herein are directed to an apparatus. The apparatus may include a primary display and at least one secondary display positioned in front of the primary display in series relative to a line of sight of a user. The at least one secondary display may be configured to serve as a backup to the primary display when upon a failure of the primary display.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to systems and methods for providing display redundancy without the shortcomings of the conventional redundant display implementations. A primary display and at least one backup display may be utilized. The primary display and the at least one backup display may be controlled by separate image processors. In some embodiments, when the primary display fails, the backup display may be engaged in situ for providing the required redundancy without affecting a pilot's cross-check habit patterns. The in situ backup display may be configured to operate in a full mode (as opposed to a reversionary mode when an adjacent display is forced to serve as a backup). In addition, the backup displays may be provided in manners that do not clutter instrument panels.

Figure 1:
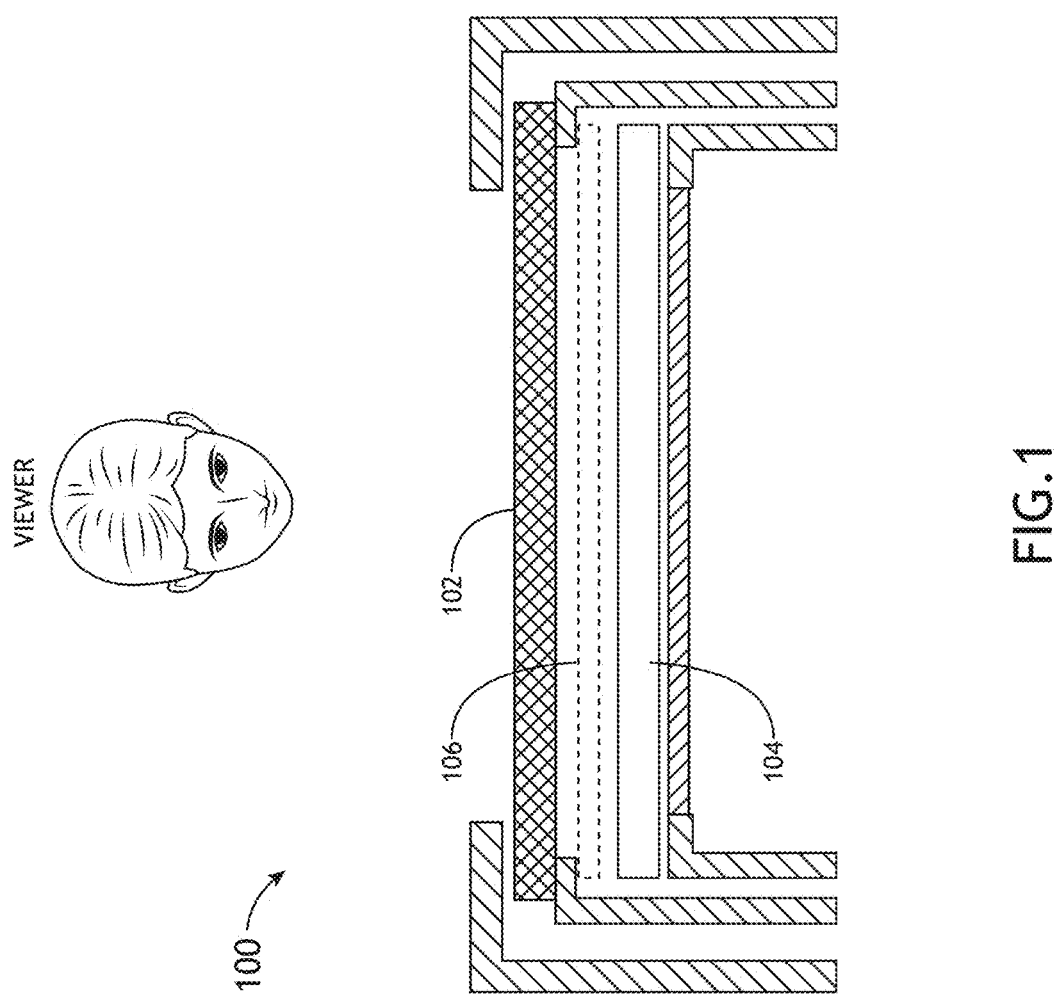
FIG. 1 is a cross-sectional view of an exemplary display device including stackable displays according to an exemplary embodiment of the inventive concepts disclosed herein.

Referring to FIG. 1, an embodiment of a display device 100 including a first display 102 stacked on top of (with respect to the orientation depicted in FIG. 1) a second display 104 is shown. The first (top) display 102 may be configured with certain transparent and/or transmissive properties, and by stacking the two displays 102 and 104 in series relative to a line of sight of a viewer (e.g., a pilot, or more generally, a user), the second (bottom) display 104 positioned behind the first display 102 can be made visible to the user when needed.

Both the first display 102 and the second display 104 may be implemented utilizing thin panel emissive display technologies. For instance, the first display 102 and/or the second display 104 may be implemented as field emission displays, light-emitting diode (LED) displays, organic light-emitting diode (OLED) displays, surface-conduction electron-emitter displays (SEDs) or the like. Alternatively, the first display 102 and/or the second display 104 may be implemented as thin panel non-emissive displays such as liquid crystal displays (LCDs) or the like. It is contemplated that in certain implementations, the primary display 102 and/or the secondary display 104 may be capable of supporting three-dimensional (3D) viewing; however, it is to be understood that 3D viewing capabilities are not required.

In some embodiments, the first display 102 may be utilized as a primary display and the second display 104 may be utilized as a secondary display that serves as an in situ backup to the first display 102. For example, if the first display 102 is an emissive display, the second display 104 may be turned off (i.e., disengaged) during normal operations and engaged as a backup to the first display 102 if/when the first display 102 fails. It is contemplated that the first display 102 may be configured to appear as a substantially transparent substrate to the user when the first display 102 fails. From the user's perspective, the display device 100 may continue to be fully operable, but from an operations' perspective, the images are now being provided by the second display 104 instead of the first display 102.

In another example, if the first display 102 is a non-emissive display (e.g., a LCD panel), the second display 104 may be configured to serve as a light source (e.g., a homogeneous backlight) to illuminate the first display 102 during normal operations. In the event that the first display 102 fails to operate properly, the first display 102 may fail to a transmissive state, which may allow the first display 102 to appear as a substantially transparent substrate and may allow the second display 104 serve as a backup as described above.

It is contemplated that the display device 100 may also include one or more filters 106 positioned between the first display 102 and the second display 104. The one or more filters 106 may provide various spectral properties that may be appreciated for various operating conditions. For instance, if the display device 100 needs to be night vision compatible, and if the second display 104 is utilized to provide illumination for the first display 102, then one or more night vision compatible filters 106 may be utilized to modify the illumination provided by the second display 104 in a night vision compatible manner. It is to be understood that night vision compatibility referenced herein is merely exemplary; other types of filters that can modify light directions and/or other spectral properties (e.g., including one or more polarizing filters, 3D projection filters, color filters and the like) may be utilized without departing from the broad scope of the inventive concepts disclosed herein.

It is also to be understood that one or more of such filters 106 may be positioned on top of the first display 102 without departing from the broad scope of the inventive concepts disclosed herein.

Furthermore, it is contemplated that the second display 104 may be configured to serve certain supplemental functions in addition to merely providing redundancy. For instance, the second display 104 may serve as a supplemental image forming layer working in conjunction with the first display 102. It is contemplated that providing multiple image forming layers may be appreciated in various situations. For example, a navigation map may be displayed utilizing the first display 102 at a first brightness setting, and any traffic and/or weather information may be displayed utilizing the second display 104 at different brightness settings, effectively increasing readability of the information provided. In another example, the second display 104 (with help from one or more filters 106) may be configured to display images only visible from certain designated viewing angles or when certain compatible viewing devices are used. In this manner, a person viewing the display device 100 would only be able to see the images provided by the first display 102, but not the images provided by the second display 104 unless that person is viewing the display device 100 from the designated viewing angles or using the compatible viewing devices, effectively guarding against unauthorized viewing of the displayed information.

It is to be understood that the second display 104 may be utilized to serve various other supplemental functions without departing from the broad scope of the inventive concepts disclosed herein. It is also to be understood that while the second display 104 may be utilized to serve various other functions, providing redundancy to the first display 102 may still be configured as a main function of the second display 104. That is, if the first display 102 fails, the second display 104 may cease to provide all of its supplemental functions and start to serve as a backup to the first display 102.

Figure 2:
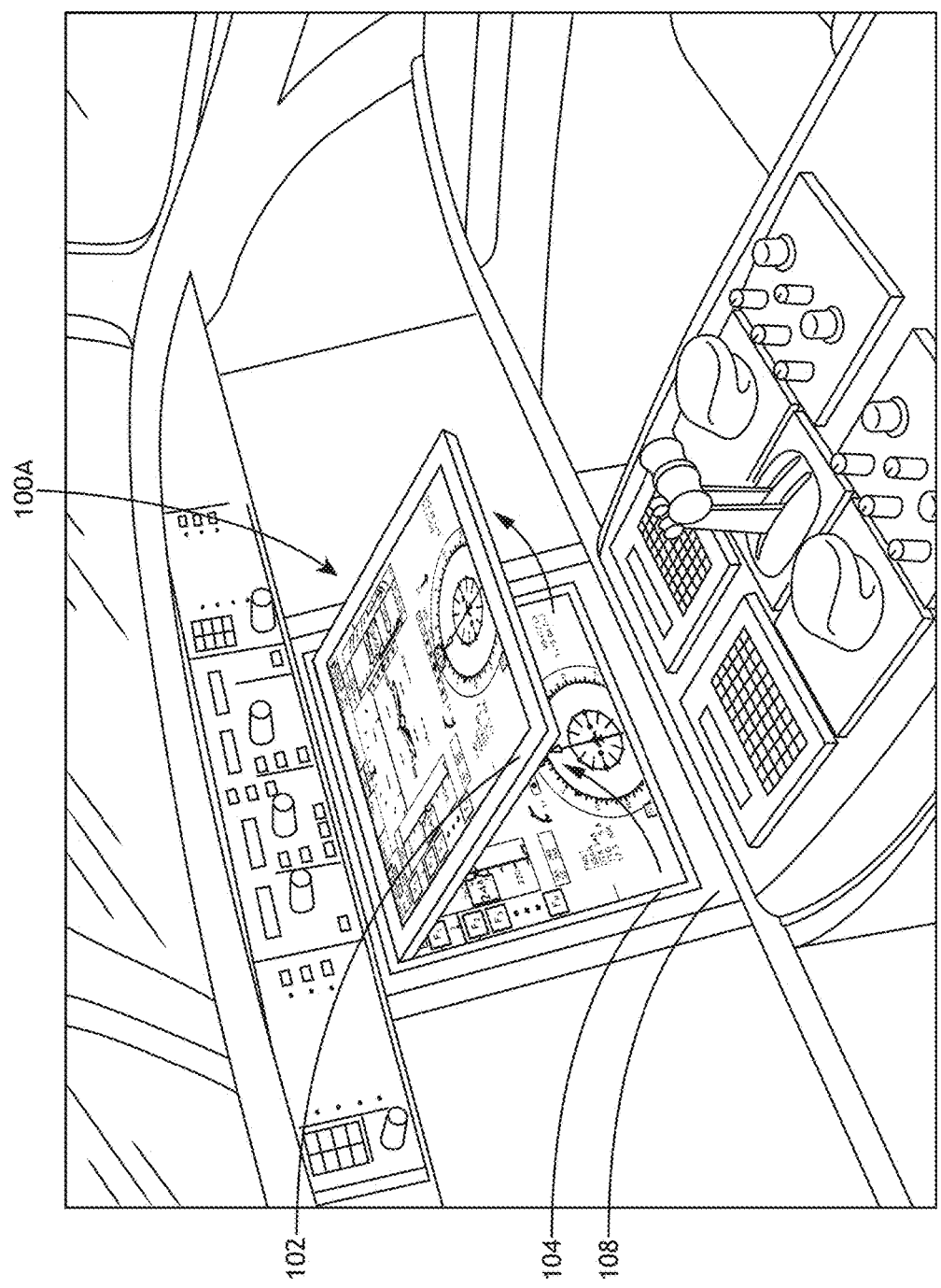
FIG. 2 is a front view of an exemplary display device including removable displays according to an exemplary embodiment of the inventive concepts disclosed herein.
Figure 3:
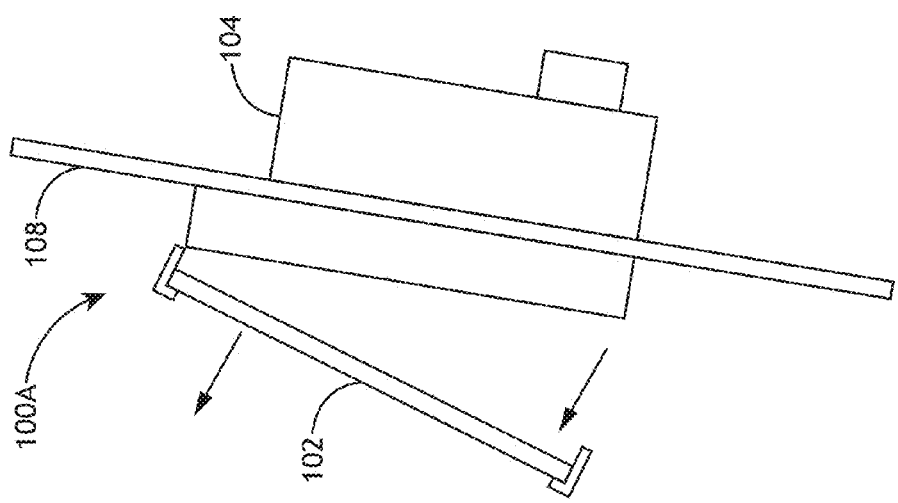
FIG. 3 is side view of an exemplary display device with a removable display according to an exemplary embodiment of the inventive concepts disclosed herein.
Figure 3:

Referring now to FIGS. 2 and 3, another embodiment of the display device 100A is shown attached to an instrument panel 108. The display device 100A may include the first display 102 and the second display 104 similar to the display device 100 described above. However, it is noted that the first display 102 may be removable with respect to the second display 104. In this manner, the user may remove the first display 102 from the instrument panel 108 when the first display 102 fails, and the removal of the first display 102 may engage the second display 104, which may then serve as a backup to the first display 102 as previously described.

It is contemplated that various options may be provided for stowing the first display 102 upon its removal. For example, the first display 102 may be configured to pivot along one of its edges until the first display 102 is generally perpendicular to its original position, at which point the first display 102 may become slidable and may be stowed into a storage compartment in a manner similar to a pivot sliding door. In another example, the first display 102 may be a flexible display (e.g., a flexible emissive display) that may be rolled or folded toward one of its edges to reveal the second display 104. In still another example, the first display 102 may be physically detached from the instrument panel 108 to be stowed elsewhere. It is to be understood that the storage options described above are merely exemplary; other storage options may be implemented without departing from the broad scope of the inventive concepts disclosed herein.

Figure 4:
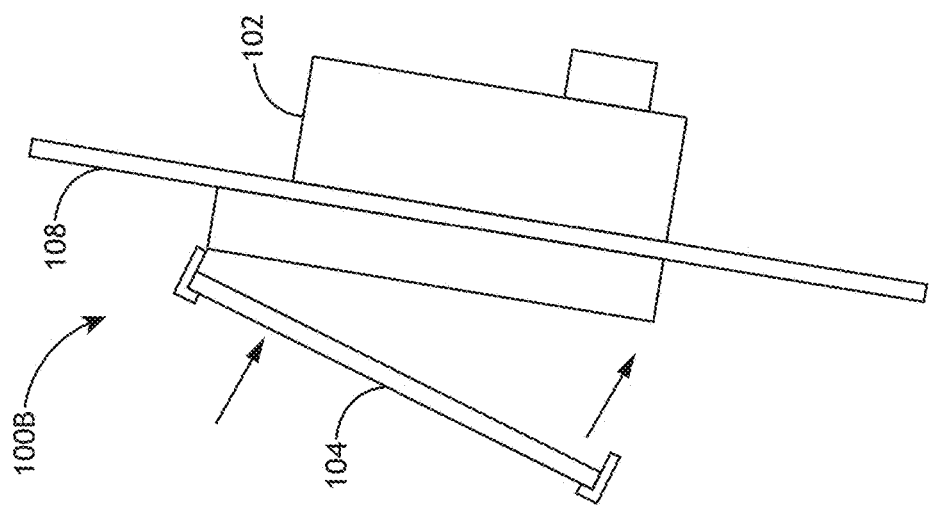
FIG. 4 is side view of another exemplary display device with a removable display according to an exemplary embodiment of the inventive concepts disclosed herein.
Figure 4:

It is also contemplated that while FIG. 3 shows the first display 102 being implemented as a removable display, such an implementation is merely exemplary. Alternatively, as shown in FIG. 4, another embodiment of the display device 100B may include the first display 102 that is configured to be stationary (with respect to the instrument panel 108) and the second display 104 that is configured to be removable instead. The second display 104 may be stowed in manners similar to the various options described above, and the second display 104 may be selectively engaged when needed.

In some embodiments, the user may engage the second display 104 by overlaying the second display 104 on top of the first display 102. Once the second display 104 is engaged, wired or wireless electrical and/or signal connections may be established, allowing the second display 104 to function as a backup to the first display 102. It is contemplated, however, that the second display 104 is not required to be overlaid on top of the first display 102. That is, the user may be able to place the second display 104 at any location of the user's choosing and still be able to engage the second display 104 as a backup display.

It is further contemplated that the user may also have the option to utilize the second display 104 to provide supplemental functions when permissible. For example, the user may utilize the second display 104 as a supplemental display in conjunction with the first display 102. In some embodiments, the first display 102 may be utilized to display a first set of data (e.g., primary flight information) while the second display 104 may be utilized to display a second set of data (e.g., secondary flight information) that may be less critical than the first set of data. In the event that the first display 102 fails to operate properly, however, the second display 104 may cease to provide all of its supplemental functions and start to serve as a backup to the first display 102.

It also contemplated that it may not be necessary to configure the second display 104 as a removable display as shown in FIG. 4. In other words, the second display 104 may be bonded to the first display 102 in a non-removable manner as shown in an exemplary embodiment 100C depicted in FIG. 5. As previously described, the second display 104 may serve as a backup to the first display 102 automatically if/when the first display 102 fails. More specifically, the second display 104 may be turned off (i.e., disengaged) when it is in a standby mode, allowing the second display 104 to appear as a substantially transparent substrate to a user during normal operations. The second display 104 may be turned on (i.e., engaged) automatically if/when the first display 102 fails.

Figure 5:
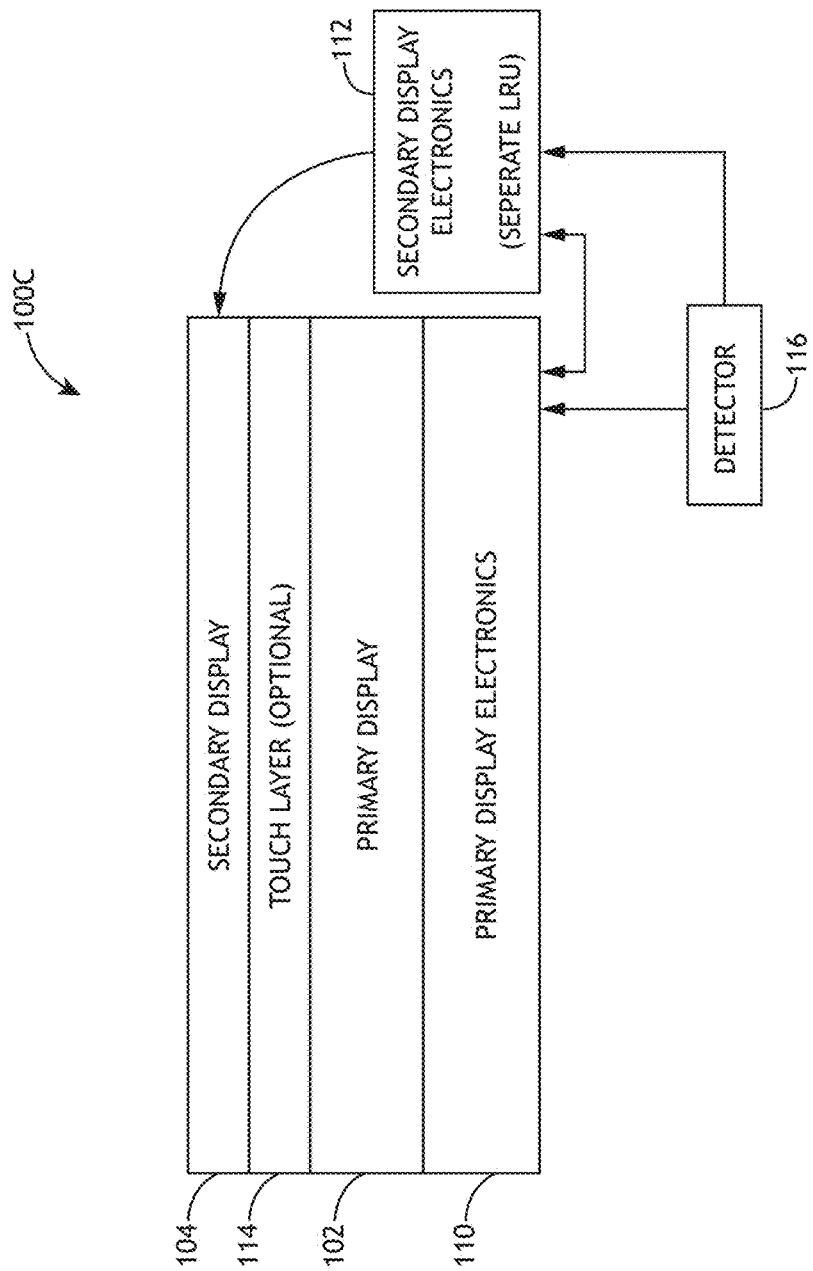
FIG. 5 is a cross-sectional illustration of another exemplary display device according to an exemplary embodiment of the inventive concepts disclosed herein.

Also depicted in FIG. 5 are the independent controllers (may also be referred to as image processors) 110 and 112 utilized to independently power and control the first display 102 and the second display 104, respectively. In some embodiments, the second display 104 may be driven remotely by a hidden, secondary controller 112 communicatively coupled with the second display 104 via a flat cable or flex connector routed behind the primary display. Alternatively, the secondary controller 112 may be integrated into the primary display unit, but configured to maintain its independent/redundant internal circuitry. In some embodiments, the secondary controller 112 may actively monitor the operations of the first display 102 and its controller 110, allowing the secondary controller 112 to activate the second display 104 if/when a failure is detected. Alternatively and/or additionally, the primary controller 110 may be configured to notify the secondary controller 112 when it fails, and the secondary controller 112 may in turn activate the second display 104 when notified. In addition, a dedicated circuitry (referred to as a detector) 116 may be utilized to monitor the operations of the first display 102 and its controller 110 and notify the secondary controller 112 when a failure is detected. Furthermore, a user may be able to control the secondary controller 112 and activate the second display 104 if/when needed. It is contemplated that the secondary controller 112 may be configured and controlled in various other manners without departing from the broad scope of the inventive concepts disclosed herein. It is also contemplated that the secondary controller 112 is not required in all displays. In other words, a display device in accordance with certain embodiments of the inventive concepts disclosed herein may or may not implement a secondary controller 112 without departing from the broad scope of the inventive concepts disclosed herein.

It is further contemplated that certain display implementations may provide support for touch input. It is to be understood that while an optional touch layer 114 is depicted in FIG. 5 for illustrative purposes, the specific location and implementation (e.g., resistive sensing, capacitive sensing, optical image sensing or the like) of such a touch layer 114 may vary.

It is noted that the various embodiments in accordance with the inventive concepts disclosed herein are capable of providing single display devices 100 that can satisfy redundancy requirements without utilizing adjacent displays. It is also noted that a display device 100 implemented in accordance with the inventive concepts disclosed herein may replace two or more displays positioned across an instrument panel of an aircraft. Such a display device 100 not only reduces instrument panel clutter, but also provides in situ backup at an ideal location. In addition, the display device 100 may provide full mode backup capabilities, further minimizing the impact of a primary display failure on a user.

Figure 6:
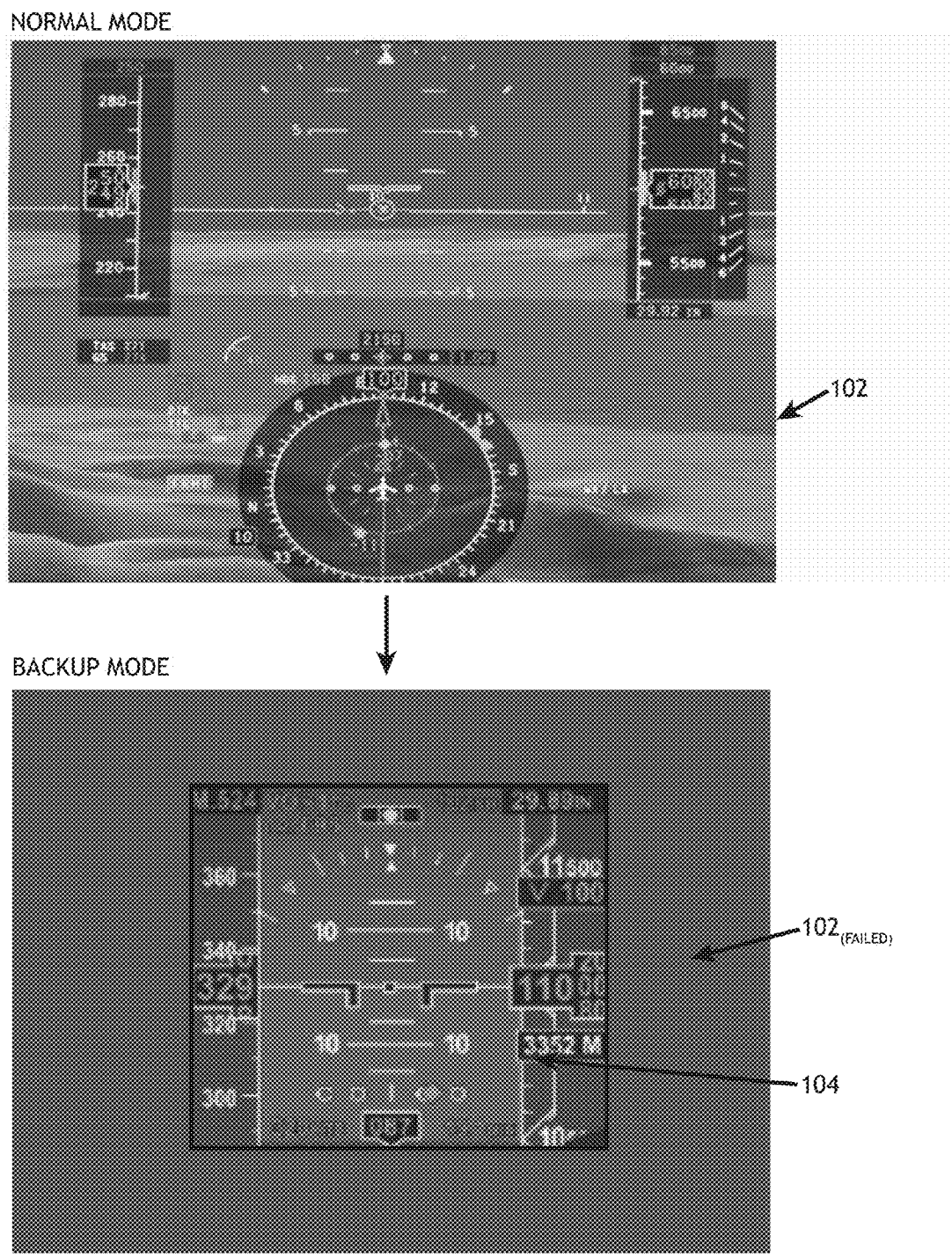
FIG. 6 is an illustration depicting different modes of operation provided by an exemplary display device according to an exemplary embodiment of the inventive concepts disclosed herein.

It is further contemplated that while one of the features provided by the display devices in accordance with the inventive concepts disclosed herein is the ability to provide full mode backup capabilities, providing such capabilities is not meant to be a requirement for all displays. For cost and/or other reasons, the second display 104 referenced in the descriptions above may include an active display area that is smaller than the active display area of the first display 102, and as depicted in the example shown in FIG. 6, if/when the first display 102 fails, the second display 104 may be engaged and the flight information may be presented in a reversionary (backup) mode.

It is to be understood that while both emissive and non-emissive displays may be utilized to serve as second displays 104 in accordance with the inventive concepts disclosed herein, emissive displays may provide certain features that may be appreciated compared to non-emissive displays. For instance, an emissive display may be built very thin and/or flexible, which in turn may reduce the overall size of the display device 100. In addition, the fact that an emissive display may serve as a light source may be beneficial as previously described. It is to be understood that other features of emissive displays may also be appreciated without departing from the broad scope of the inventive concepts disclosed herein.

It is also contemplated that certain display devices 100 implemented in accordance with the inventive concepts disclosed herein may include two or more secondary displays configured to provide additional redundancy and/or to further expand the supplemental functions that the secondary displays may provide. It is to be understood that whether a display device 100 implements one or more secondary display may be determined based on various factors, and the number of secondary displays may vary without departing from the broad scope of the inventive concepts disclosed herein.

It is also to be understood that while aircraft display systems are referenced in the examples above, such references are merely exemplary. Display devices in accordance with the inventive concepts disclosed herein may be applicable to various types of vehicles and various types of situations where providing fast replacement and/or redundancy of information displays may be appreciated. It is contemplated that specific applications of the display devices may vary without departing from the broad scope of the inventive concepts disclosed herein.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An apparatus, comprising:
a primary display, the primary display being a thin panel display, the primary display including touch layer;
at least one secondary display positioned behind the primary display in series relative to a line of sight of a user, the at least one secondary display being a thin panel display, wherein the primary display and the at least one secondary display are electronic displays independently powered and controlled by independent image processors, wherein the primary display includes a substantially transparent property, and wherein the at least one secondary display is configured to serve as a supplemental display and as a backup to the primary display upon said failure of the primary display; and
a detector, the detector configured to monitor operation of the primary display and the at least one secondary display, the detector configured to communicate with the independent image processors associated with the primary display and the at least one secondary display and notify the image processor of the at least one secondary display when the primary display has failed, wherein said primary display is configured to pivot along an edge of the primary display until generally perpendicular to an original position and slidable into a storage compartment.

2. The apparatus of claim 1, wherein the at least one secondary display is an emissive display.

3. The apparatus of claim 1, further comprising:
a filter positioned between the primary display and the at least one secondary display, wherein the filter is configured to modify illumination provided by the at least one secondary display.

4. The apparatus of claim 3, wherein the filter is utilized to provide a night vision compatibility, a spectrum modification, or a direction modification.

5. The apparatus as claimed in claim 1, wherein the primary display is configured to present a navigation map and the at least one secondary display is configured to present traffic or weather information.

6. The apparatus as claimed in claim 1, wherein the primary display is configured to present an image at a first brightness setting and the at least one secondary device is configured to present another image at a second brightness setting.

7. An apparatus, comprising:
a primary display, the primary display being a thin panel display, the primary display including touch layer;
at least one secondary display positioned behind the primary display in series relative to a line of sight of a user, the at least one secondary display being a thin panel display, wherein the primary display and the at least one secondary display are electronic displays independently powered and controlled by independent image processors, and wherein the at least one secondary display is configured to serve as a supplemental display and as a backup to the primary display upon said failure of the primary display; and
a detector, the detector configured to monitor operation of the primary display and the at least one secondary display, the detector configured to communicate with the independent image processors associated with the primary display and the at least one secondary display and notify the image processor of the at least one secondary display when the primary display has failed, wherein said primary display is configured to pivot along an edge of the primary display until generally perpendicular to an original position and slidable into a storage compartment.

8. The apparatus of claim 7, wherein the at least one secondary display is an emissive display.

9. The apparatus of claim 7, further comprising:
a filter positioned between the primary display and the at least one secondary display, wherein the filter is configured to modify illumination provided by the at least one secondary display.

10. The apparatus of claim 9, wherein the filter is utilized to provide a night vision compatibility, a spectrum modification, or a direction modification.

11. The apparatus as claimed in claim 7, wherein the primary display is configured to present a navigation map and the at least one secondary display is configured to present traffic or weather information.

12. The apparatus as claimed in claim 7, wherein the primary display is configured to present an image at a first brightness setting and the at least one secondary device is configured to present another image at a second brightness setting.

* * * * *